(12) United States Patent  (10) Patent No.: US 7,657,245 B2
Nakagawa et al.  (45) Date of Patent: Feb. 2, 2010

(54) ELECTRONIC DEVICE

(75) Inventors: Yoshio Nakagawa, Nagoya (JP); Takamitsu Kawai, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 639 days.

(21) Appl. No.: 11/411,959

(22) Filed: Apr. 27, 2006

(65) Prior Publication Data

US 2006/0246866 A1 Nov. 2, 2006

(30) Foreign Application Priority Data

Apr. 27, 2005 (JP) ............................. 2005-130096

(51) Int. Cl.
  H04B 1/10 (2006.01)
  H04B 1/38 (2006.01)
  H04B 1/034 (2006.01)
  H04B 1/08 (2006.01)
  H04M 1/00 (2006.01)
  H04N 1/034 (2006.01)

(52) U.S. Cl. .................... 455/301; 455/575.1; 455/90.3; 455/128; 455/347; 347/3

(58) Field of Classification Search ................. 455/301; 347/3, 138, 149, 170, 100.2
See application file for complete search history.

(56) References Cited

U.S. PATENT DOCUMENTS

| 5,627,731 | A  | * | 5/1997  | Sato et al.      | 361/796 |
| 6,501,945 | B1 | * | 12/2002 | Chien            | 455/296 |
| 7,398,072 | B2 | * | 7/2008  | Corrigan et al.  | 455/301 |
| 2001/0044290 | A1 | * | 11/2001 | Bobier       | 455/301 |

FOREIGN PATENT DOCUMENTS

| JP | 2000184316 | 6/2000 |
| JP | 2001290558 | 10/2001 |
| JP | 2002344172 | 11/2002 |

* cited by examiner

*Primary Examiner*—Nick Corsaro
*Assistant Examiner*—Shannon R Brooks
(74) *Attorney, Agent, or Firm*—Baker Botts L.L.P.

(57) ABSTRACT

An electronic device is equipped with a wireless unit board for transmitting and receiving a radio signal to and from external equipment, where an accommodation space for the wireless unit board is enclosed by a side plate of a casing of the electronic device, a first shield plate covering a circuit board, and a second shield plate holding a main control board thereupon and disposed substantially horizontally above the first shield plate. The wireless unit board is disposed in the accommodation space with one of opposed major surfaces thereof facing to the side plate of the casing.

17 Claims, 18 Drawing Sheets

ELECTRONIC DEVICE

CROSS-REFERENCE OF RELATED APPLICATION

This nonprovisional application claims priority under 35 U.S.C. §119 (a) on Patent Application No. 2005-130096 in Japan on Apr. 27, 2005, the entire contents of which are hereby incorporated by reference.

BACKGROUND OF THE INVENTION

1. Field of the Invention

The present invention relates to a construction of an electronic device such as an image-forming device equipped with a wireless unit board, such as a wireless LAN board, for transmitting and receiving a radio signal to and from external equipment.

2. Description of the Related Art

In recent years, with progress of networking in offices and homes, and with realization of wireless data communication as fast as wired data communication or even faster by adopting IEEE 802.11 as a standard specification for a wireless LAN system, development of electronic devices, such as personal computers (hereinafter referred to as PCs), that can conduct data communication using the wireless LAN system is feverishly conducted.

An example of methods for using a wireless LAN is to externally connect an adapter provided as a wireless LAN card disclosed in Japanese Patent Application Laid-Open No. 2002-344172 (see FIG. 1) to an electronic device such as a PC or a printer. Another example is to provide a wireless LAN board in the electronic device. For example, Japanese Patent Application Laid-Open No. 2001-290558 (see FIGS. 1 and 2) discloses that a wireless LAN board (also called as a wireless LAN unit) is provided on a rear side of a front panel of a main unit case of an electronic device so as to reduce time and effort for external wiring as well as an installation space. Further, Japanese Patent Application Laid-Open No. 2000-184316 (see FIGS. 2, 4, and 9) discloses a wireless LAN board (also called as a wireless LAN card) provided inside a main unit case of a projection display apparatus (projector).

Radio waves to be used for the IEEE 802.11a/g standard are in a 2.4 GHz band, and those to be used for the IEEE 802.11a standard are in a 5 GHz band. Accordingly, a circuit unit such as a CPU operating at maximum frequencies and mounted on a main control board of the electronic device is susceptible to electromagnetic noise caused by such radio waves transmitted from an antenna of the wireless LAN board. There has also been a problem that a circuit unit (wireless module) on the wireless LAN board and a harness (wiring) connecting the wireless LAN board to the main control board are subject to electromagnetic noise, when they are in the vicinity of a power board with strong magnetic field lines.

Therefore, in Japanese Patent Application Laid-Open No. 2002-344172, a circumference of the wireless LAN board is shielded with upper and lower plate covers, and in Japanese Patent Application Laid-Open No. 2001-290558, a through hole is provided at a portion of a substrate of the wireless LAN board, in a thickness direction of the substrate, where no ground pattern is formed, and a conductor in the through hole is connected to one end of a wire line which passes through the substrate and is connected to the circuit unit (wireless module) of the wire line. Further, in Japanese Patent Application Laid-Open No. 2000-184316, a plating film is formed on an area of an inner surface of an upper cover of the electronic device so as to face a part of the wireless LAN board excluding the antenna, and the remaining area of the inner surface of the upper cover that faces the antenna constitutes an uncovered area as an area through which radio waves pass.

BRIEF SUMMARY OF THE INVENTION

However, a problem has been noted that providing a plate or a plating film as a measure for noise reduction, as in Japanese Patent Applications Laid-Open No. 2002-344172 and No. 2000-184316, could lead to increased cost.

Also, according to the above Japanese Patent Application Laid-Open No. 2001-290558, if a wire line is provided through a substrate and connected to a conductor inside a through hole, or a plating film is formed as a ground pattern on a surface of the substrate, there still remains a problem of increased cost for producing a wireless LAN board itself compared with a LAN board using a normal substrate.

The present invention has been made to solve and at least reduce these problems. An object of the present invention is to provide an electronic device for which countermeasures against electromagnetic noise can easily be taken at low cost with a skillful arrangement of a wireless unit board (wireless LAN board) by using a metallic shield member originally provided for a main control board and a metallic shield member originally provided for a circuit board such as a power board that is likely to emit electromagnetic waves.

Another object of the present invention is to provide, in consideration of the recent electronic device such as an image-forming device equipped with multi-functions having a handset (wireless communication unit) for which wireless communication is enabled, in addition to a base phone for communication via a telephone line, an electronic device for which countermeasures against electromagnetic noise can easily be taken between the wireless communication unit and a wireless unit board (wireless LAN board).

Still another object of the present invention is to provide an electronic device for which a harness (wiring) from a wireless unit board (wireless LAN board) is skillfully arranged and run so that the harness will not block radio waves transmitted between the wireless unit board and external equipment.

To achieve at least one of the above objects, an electronic device according to one aspect of the present invention is equipped with a wireless unit board for transmitting and receiving a radio signal to and from external equipment, where an accommodation space for the wireless unit board is enclosed by a side plate of a casing of the electronic device, a first shield plate covering a circuit board, and a second shield plate holding a main control board thereupon and disposed substantially horizontally above the first shield plate box. The wireless unit board is disposed in the accommodation space with one of opposed surfaces thereof facing to the side plate of the casing.

Therefore, the wireless unit board, circuit board, and main control board are separated by the first shield plate or the second shield plate from each other, so as to be made mutually less susceptible to electromagnetic noise. Further, since the accommodation space in which the wireless unit board is disposed with one of opposed major surface facing the inner surface of the side plate of the casing, it is advantageously possible to reduce the space in which the wireless unit board is disposed, thereby making the electronic device compact. Moreover, since the wireless unit board can be disposed adjacent and parallel to the inner surface of the side plate of the casing, reception of radio waves by the wireless unit board from outside the casing is ensured without being disturbed by other components.

The electronic device may be an image-forming device equipped with a transfer unit for supplying and ejecting recording media and a recorder for forming images for the recording media transferred by the transfer unit.

Therefore, exchange of image data can be made possible between multiple image-forming devices constructed as described above via wireless unit boards, while eliminating the need for wiring between them.

The above and further objects and features of the invention will more fully be apparent from the following detailed description with accompanying drawings.

DETAILED DESCRIPTION OF THE INVENTION

The following will describe some embodiments of the present invention in detail by referring to drawings.

Figure 1:
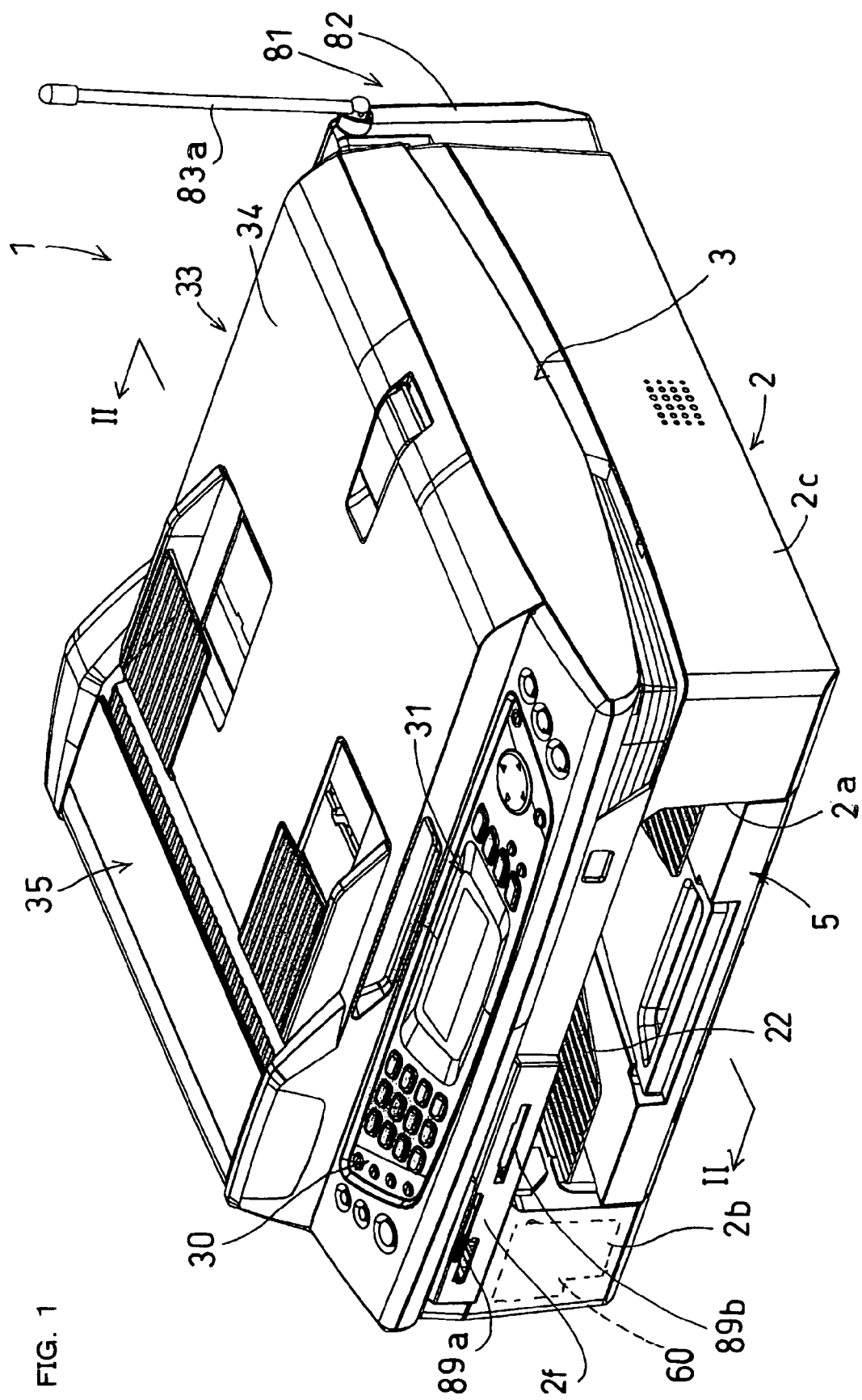
FIG. 1 is a perspective view of an image-forming device.

A multi-functional image-forming device 1 shown in FIG. 1 is provided with a facsimile function, printer function, copying function, scanner function, etc. The multi-functional image-forming device 1 includes a top-surface open, box-like main unit case 2 and an upper case 3 pivotably attached to one side (left side in the embodiment in FIG. 1) of the main unit case 2 via a pivoting axis (not shown) such as a join or a hinge. In the following description, a side on which an opening 2a is provided is referred to as a front side and the traverse (right and left) and vertical (upper and lower) directions are described with reference to the orientation of the image-forming device 1 in FIG. 1. The main unit case 2 and the upper case 3 are made of synthetic resin by injection molding.

An operator panel 30 is disposed in the top front of the upper case 3. The operator panel 30 has various kinds of buttons such as number buttons, a start button, and functional operation buttons. By pressing these buttons, various operations can be executed. The operator panel 30 has a display 31 such as a liquid crystal display (LCD) to display settings of the image-forming device 1 and various operational messages when necessary.

In the upper case 3, a scanner (image reader) 33 is disposed on a rear side of the operator panel 30. That is, the scanner 33 reads a facsimile document to be transmitted to a remote facsimile device when the facsimile function is used and reads images of a document to be copied when the copying function is used. The scanner 33 includes a flatbed reader for reading images of a document placed on a large-size glass plate and an automatic reader for reading images of a document fed by an automatic document feeder 35 disposed on one side of a cover 34 that is pivotable and covers the top surface of the flatbed reader.

Immediately below the glass plate (not shown) of the flatbed reader, a line-type contact image sensor (CIS) 36 as an example of photoelectric conversion elements to read an image surface of a document touching the glass plate is reciprocatably moveably provided along a guide axis 37 extending in a direction perpendicular to the drawing sheet surface of FIG. 2.

On the top surface of the cover 34, an output tray to place a document fed by the automatic document feeder 35, read and then ejected is formed. The cover 34 is constructed to allow pivotal opening/closing via a hinge about the rear side of the image-forming device 1.

As open posture maintaining means for maintaining a posture in which the upper case 3 is opened at a relatively large angle with respect to the main unit case 2, a guide rail (not shown) having a guide groove extending parallel to the moving direction of the image sensor 36 is secured on one side (near the rear side of the image-forming device 1) of the underside of the upper case 3, and a guide pin at the tip (top end) of a supporting bar (not shown) whose base end is pivotably attached to the far side from the pivoting axis in the main unit case 2 is movably inserted into the guide rail. Then, while the guide pin is fitted into a lock (not shown) notch-formed upward on the far side of the guide groove from the pivoting axis, the upper case 3 can be held open at a predetermined opening angle with reference to the main unit case 2.

A base phone 80 and a cradle 80a to hold the base phone 80 on standby are arranged on the outer side of the left wall of the main unit case 2 to enable a telephone call. By arranging the base phone 80 on the left side of the main unit case 2 like this, if, for example, paper is removed when a paper jam occurs or an ink cartridge is replaced, the right hand can be used to do work while holding the base phone 80 in the left hand to receive instructions about how to remove paper or replace a cartridge. In this embodiment, the base phone 80 is attached to an upper portion of the main unit case as much as possible, to the extent in which the base phone 80 does not interfere with the scanner 33 when the scanner 33 is in an upward side-open posture, i.e., within a range that there is a gap between the base phone 80 and the scanner 33 even with a variation in products. The reason why the base phone 80 is attached to an upper portion of the main unit case as much as possible is because of usability of the base phone 80 in use.

Figure 11A:
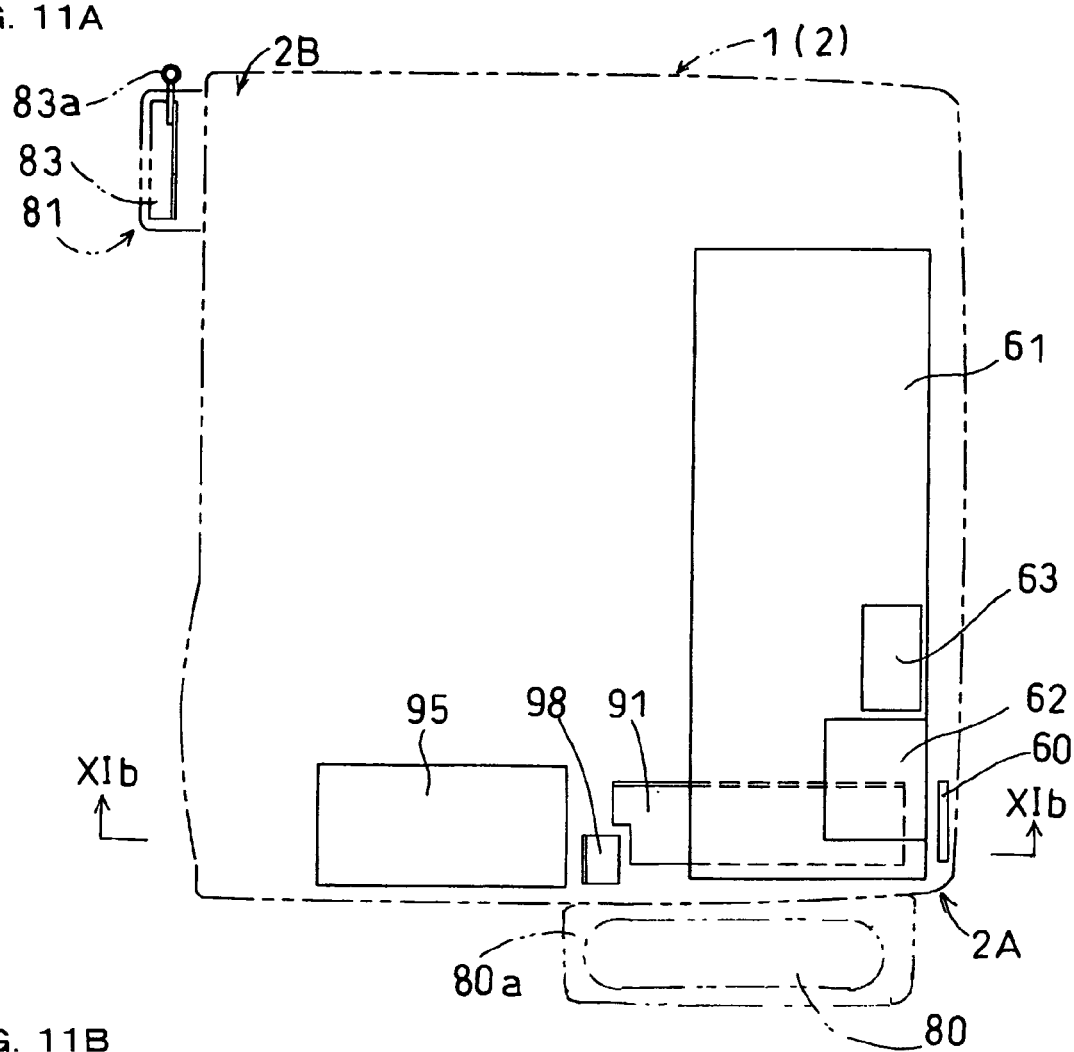
FIGS. 11A and 11B illustrate layouts of a wireless communication unit and the wireless unit board.
Figure 11B:
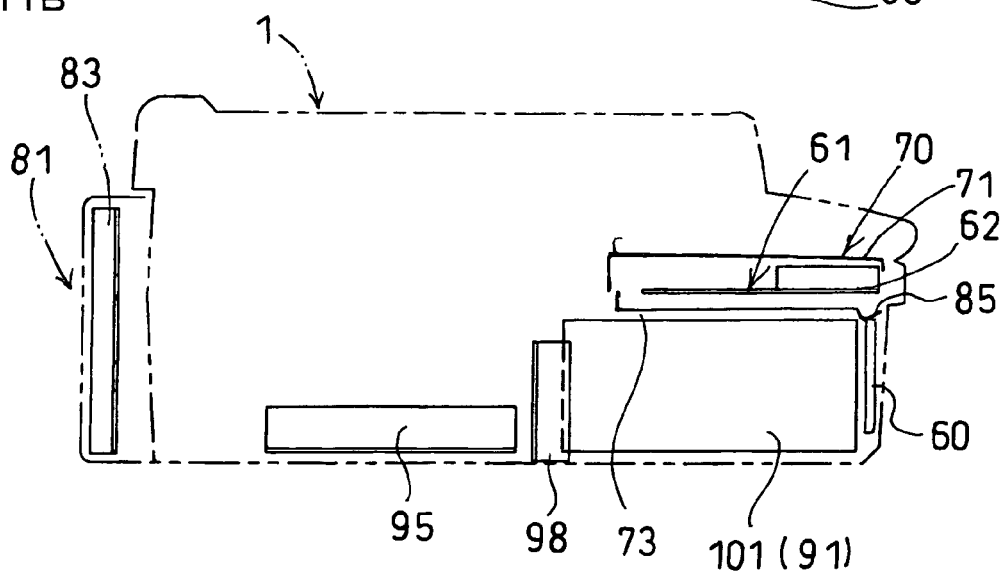

As shown in FIGS. 1, 11A, and 11B, a wireless communication unit 81 is vertically mounted near the right corner on the rear side of the main unit case 2. The wireless communication unit 81 is equipped with a holder 82 made of synthetic resin and contains a communication board (electronic component) 83. The communication board 83 is used for connection via radio waves with an additional handset at a location apart from the image-forming device 1 and an antenna 83a for transmitting and receiving radio waves projects from the holder 82.

As has been described, the image-forming device 1 of this embodiment is provided with the direct-connect base phone 80 and the wireless communication unit 81 for a cordless handset. Both base phone and handset can selectively be used according to various uses, and moreover, a call can be made between the base phone and the handset.

Although details will be described later, among corners of the main unit case 2, a corner 2A opposite to a corner 2B where the communication board 83 is disposed has a wireless unit board (wireless LAN board) 60 and a main control board 61 to electrically control driving of various devices, which will be described in detail later (see FIG. 11A). By positioning the main control board 61 and wireless unit board 60 and the communication board 83 apart from each other like this, the wireless unit board 60, main control board 61, or communication board 83 are unlikely to pick up noise.

Next, the construction of a printer device (recorder) will be explained. As shown in FIG. 2, laterally in the center inside the main unit case 2, a paper feed cassette 5 is disposed at the bottom thereof in which a plurality of sheets P as recording media are placed in a stack state, and the paper feed cassette 5 is drawably constructed with respect to an opening 2a in the front of the main unit case 2 (see FIGS. 1 and 3).

Moreover, disposed inside the main unit case 2 are a paper feed unit 6 provided with a paper feed roller 7 above the paper feed cassette 5, a transfer path that transfers the sheets P forward and substantially horizontally via a U-turn transfer path 9 that is transversely U-shaped and disposed at the rear end inside the main unit case 2, and a recorder 8 constituted from an inkjet-type printer head 12 that forms images by discharging ink on a surface of a sheet P on a flat platen 11 positioned on a transfer path.

An arm 6a of the paper feed unit 6 is pivotably mounted on a driving axis 13 that rotates via a driving motor and a driving gear mechanism (not shown). The paper feed roller 7 rotates counterclockwise in FIG. 2 via a gear mechanism inside the paper feed unit 6. A sheet P at the top of the sheets P is separated by an elastic separator 15a with a surface of large friction coefficient on a tilted separation plate 15, and the sheet P is fed between a resist roller pair 20, which include a driving transfer roller and an idling transfer roller that are disposed upstream of the printer head 12 in the transfer path. A rear cover 19 covering the rear side of the main unit case 2 is constructed so that it can be inserted and removed from the rear side of the main unit case 2 to thereby open one side of the U-turn transfer path 9.

After a predetermined image is recorded on the upper surface of the sheet P by the printer head 12, the sheet P is ejected to the output tray 22 open to a front plate 2b of the main unit case 2 and disposed in the front of the main unit case 2 and above the paper feed cassette 5, via an ejection roller pair 21, which include a driving ejection roller and a spur roller that are disposed downstream of the printer head 12.

Ink cartridges 26 for supplying ink to the printer head 12 for color recording are constructed to be detachably attached from above into the main unit case 2 with respect to a holding space 27 (see FIG. 5) adjacent to the inner surface of a side plate 2c opposite to and most widely apart from a side plate 2d having the pivoting axis. Each ink cartridge 26 contains an ink of a corresponding color. Though this embodiment contains four colors of black, cyan, magenta, and yellow, more color inks may be contained. Ink is supplied from each ink cartridge 26 to the printer head 12 by connecting a flexible ink tube 28.

Figure 2:
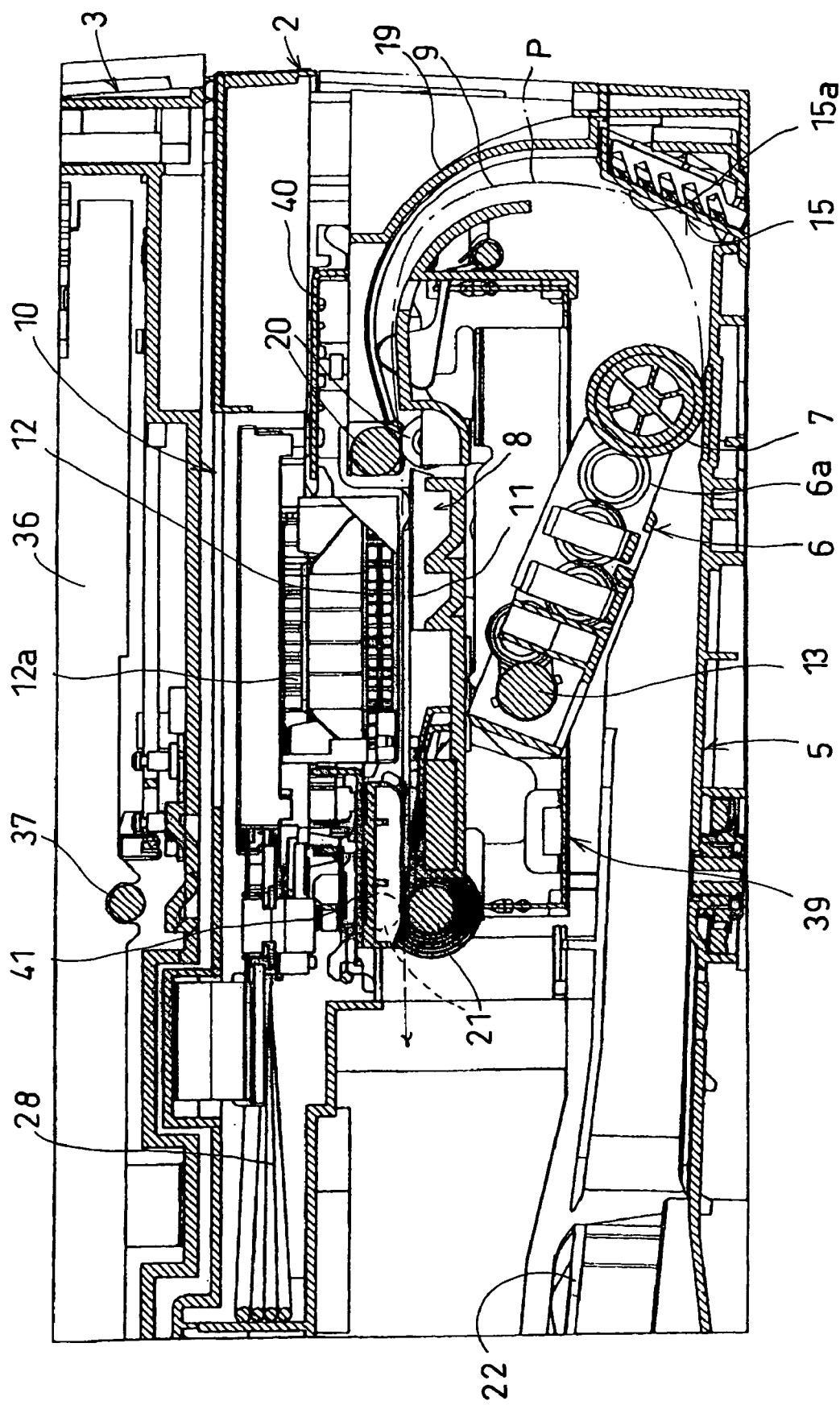
FIG. 2 is a partially enlarged sectional view taken along II-II line and seen in an arrow direction of FIG. 1.
Figure 4:
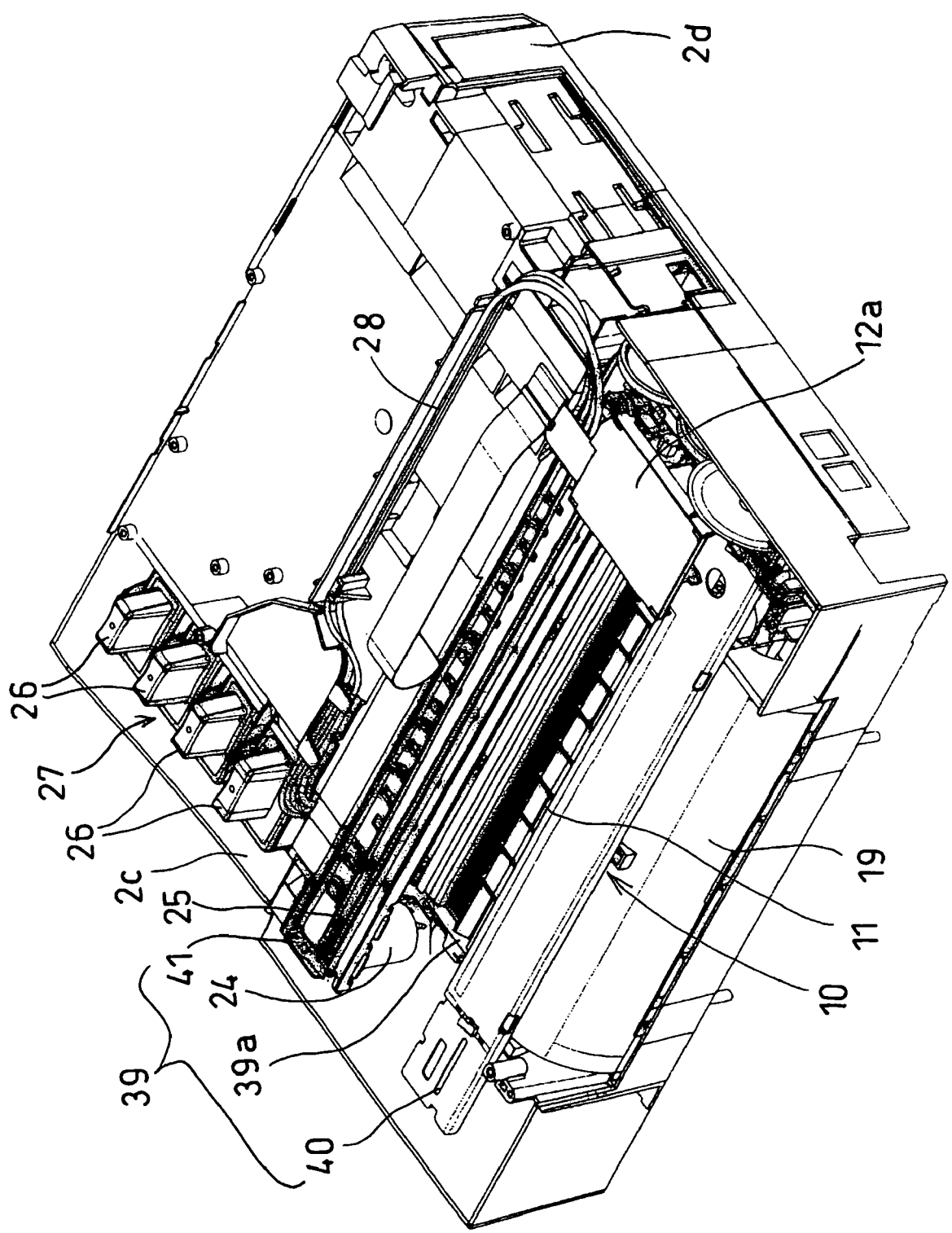
FIG. 4 is a perspective view of a main unit case seen from back after removing an upper case.

As shown in FIGS. 2 and 4, a recorder unit 10 consists essentially of a carriage 12a having the printer head 12, the plate-like platen 11 made of synthetic resin, a timing belt 25 connected to a motor 24, and an engine frame 39 made of metallic plates to support these components. The engine frame 39 is positioned on the rear side of the main unit case 2 and above the paper feed cassette 5. The engine frame 39 is made of metal and, as shown in FIG. 4, extends above a box-like main unit 39a in the traverse direction of the main unit case 2, and is equipped with a pair of guide plates 40 and 41 slidably supporting the carriage 12a. A driving axis 13 and an arm 6a of the paper feed unit 6 are pivotally fixed to the main unit 39a, and also the platen 11 and a waste liquid form (not shown) are mounted thereon.

Figure 9:
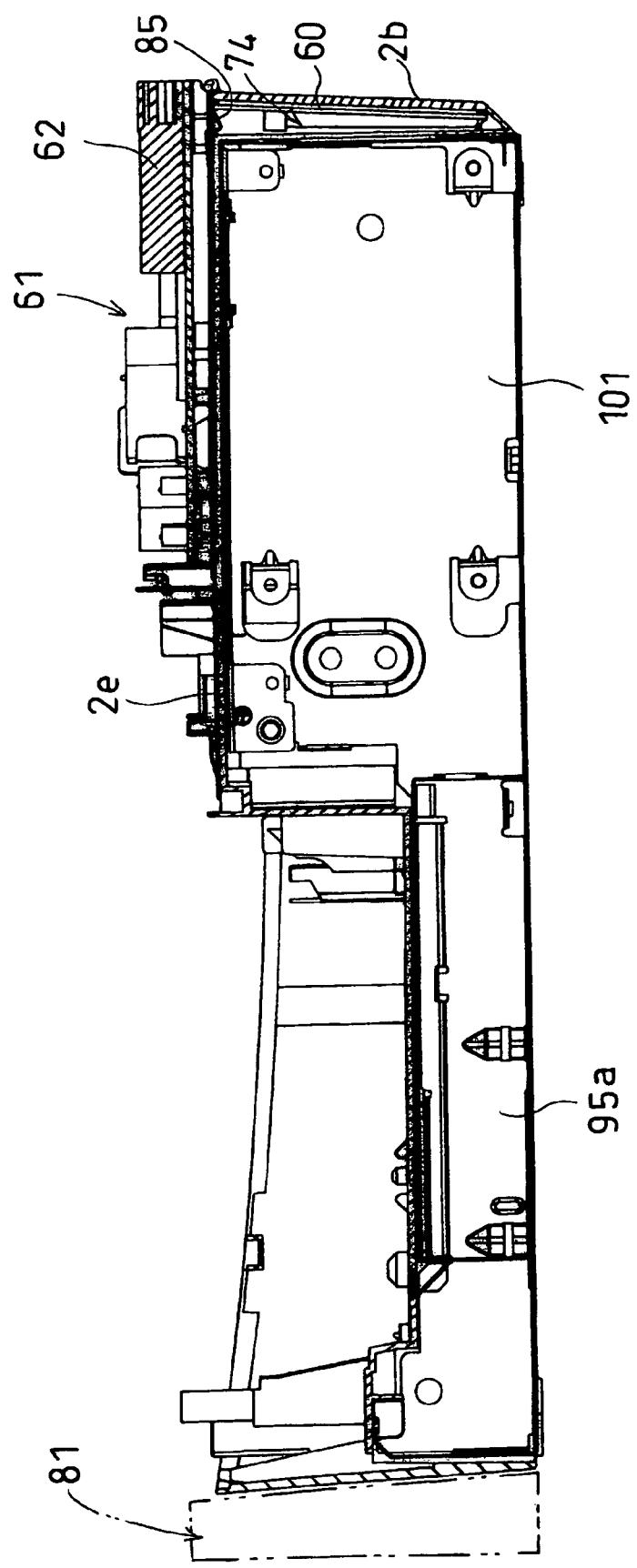
FIG. 9 is a cross sectional view taken along IX-IX line and seen in an arrow direction of FIG. 8.

On the left side (lower side in FIG. 11A) of the paper feed cassette 5, a power board 91 to supply power is positioned, and on the rear side, a shield box 95a of a plate containing a network board 95 is positioned (see FIG. 9). On the rear side of an accommodation space 74 for the wireless unit board 60, a shielding plate box 101 made of metal is positioned to enclose all electronic components of the power board 91 (see FIG. 9). Between the power board 91 and the network board 95, a sensor board 98 to detect whether the base phone 80 is in use or not is mounted.

Figure 12:
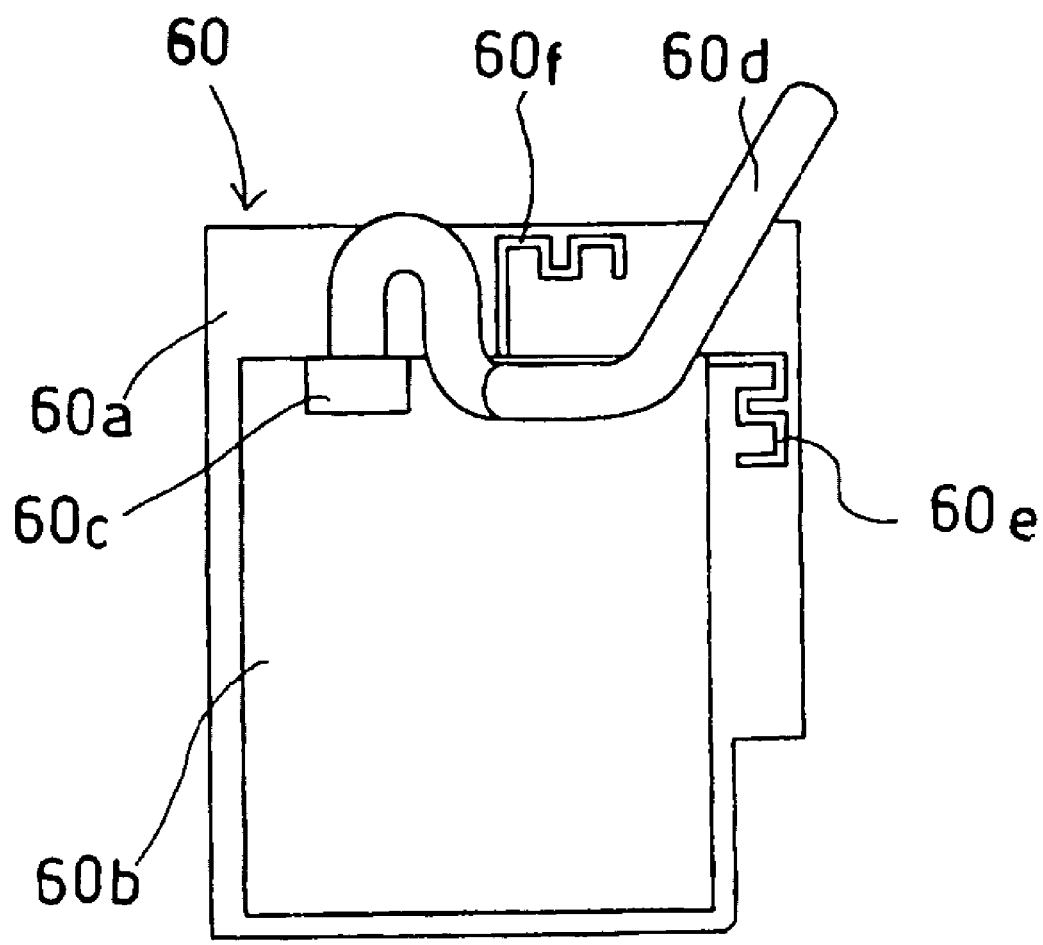
FIG. 12 is a front view of a wireless LAN board.

In an inner corner (corner 2A) at the confluence of the front plate 2b of the main unit case 2 and the left side plate 2d, the upward open accommodation space 74 is formed to accommodate the wireless unit board 60 vertically in an upright position. Thus, the accommodation space 74 is formed on the front side of the plate box 101, in an area surrounded by a rear partition plate 2g, the front plate 2b, and a side partition plate 2h, all made of synthetic resin and integrally formed with the main unit case 2 (see FIG. 13). Also, the accommodation space 74 is positioned in close proximity to a diagonal line drawn from the rear right corner where the wireless communication unit 81 is disposed, to the front left corner of the main unit case 2. As shown in FIG. 12, the wireless unit board 60 has a circuit module 60b mounted on one side (surface) of the board 60a made of glass/epoxy material and a harness 60d for wiring is detachably connected to a connector 60c provided at a part of the circuit module 60b. FIG. 12 does not show the tip side of the harness 60d, which is cut at an intermediate part thereof. On the surface of the board 60a, a main antenna 60e is formed adjacent to the circuit module 60b on one side thereof, and a sub-antenna 60f is formed on the upper side.

Provided on the front side of a top surface plate 2e of the main unit case 2 and above the paper feed cassette 5 is a bearing surface on which the main control board 61 is placed.

The main control board 61 has a substantially rectangular shape extending along the driving direction (traverse direction of the front plate 2b) of the printer head 12 and is covered with a shield case 70 including upper and lower shield plate members 71 and 73 made of metal. When the shield case 70 is mounted, the main control board 61 is located substantially within the height of the recorder unit 10 including the carriage 12a and printer head 12. By arranging the main control board 61 side by side with the recorder unit 10 and within the height of the recorder unit 10, the height of the image-forming device 1 can be reduced compared when they are arranged vertically one on the other.

Figure 6:
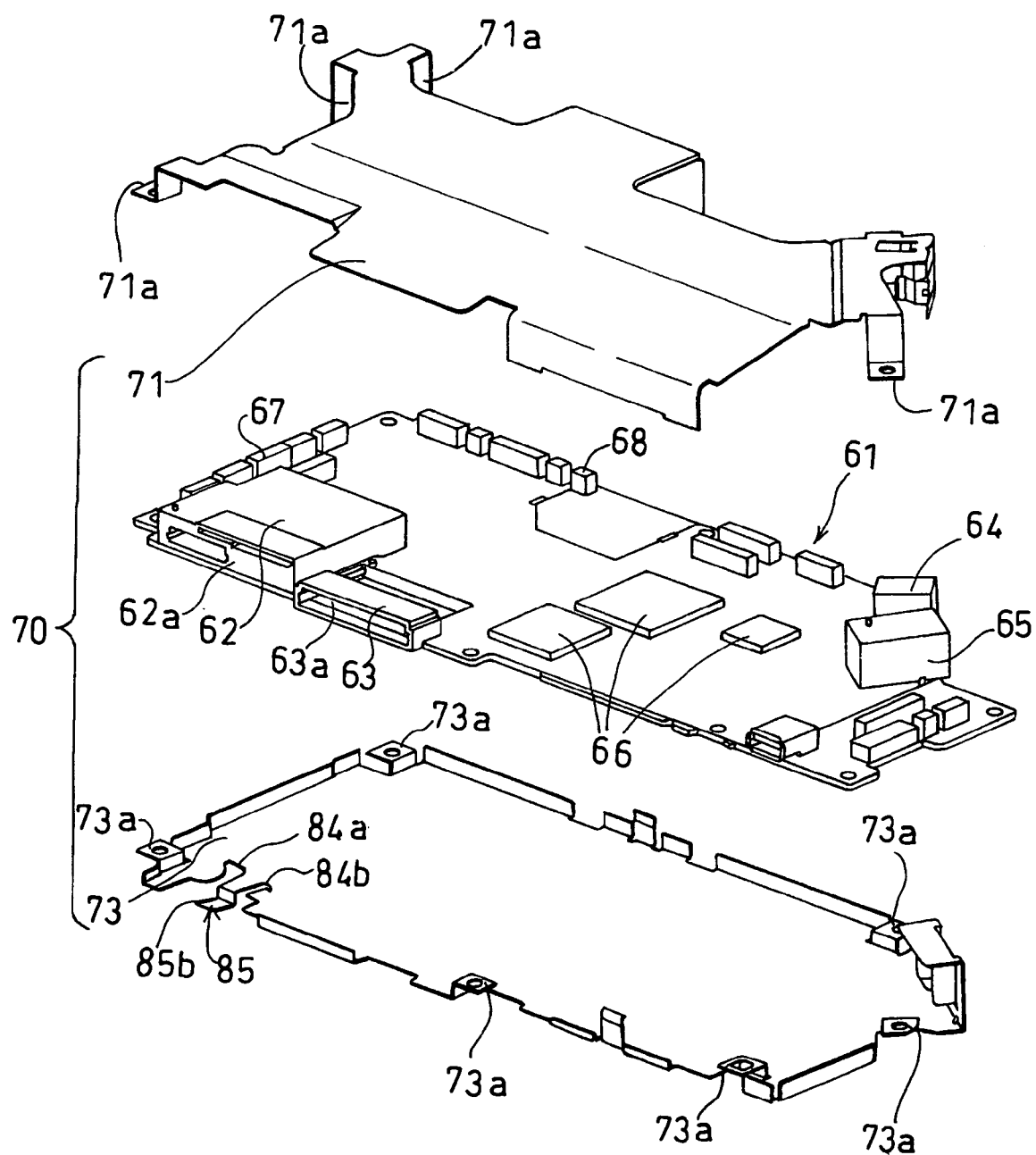
FIG. 6 is a perspective view showing a shield case and a main control board.
Figure 7:
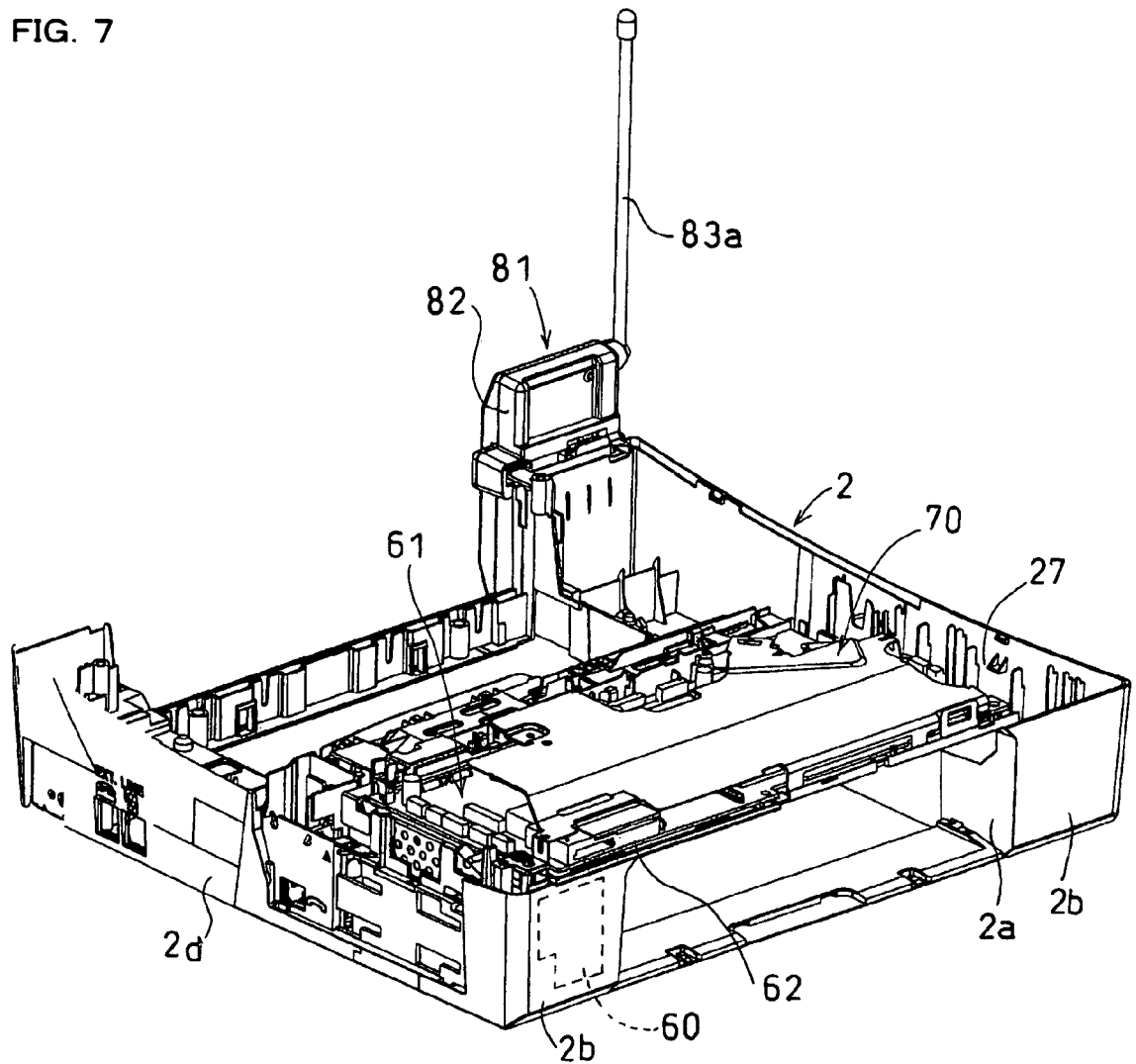
FIG. 7 is a perspective view of the main unit case after removing a recorder unit and a paper feed cassette.
Figure 10:
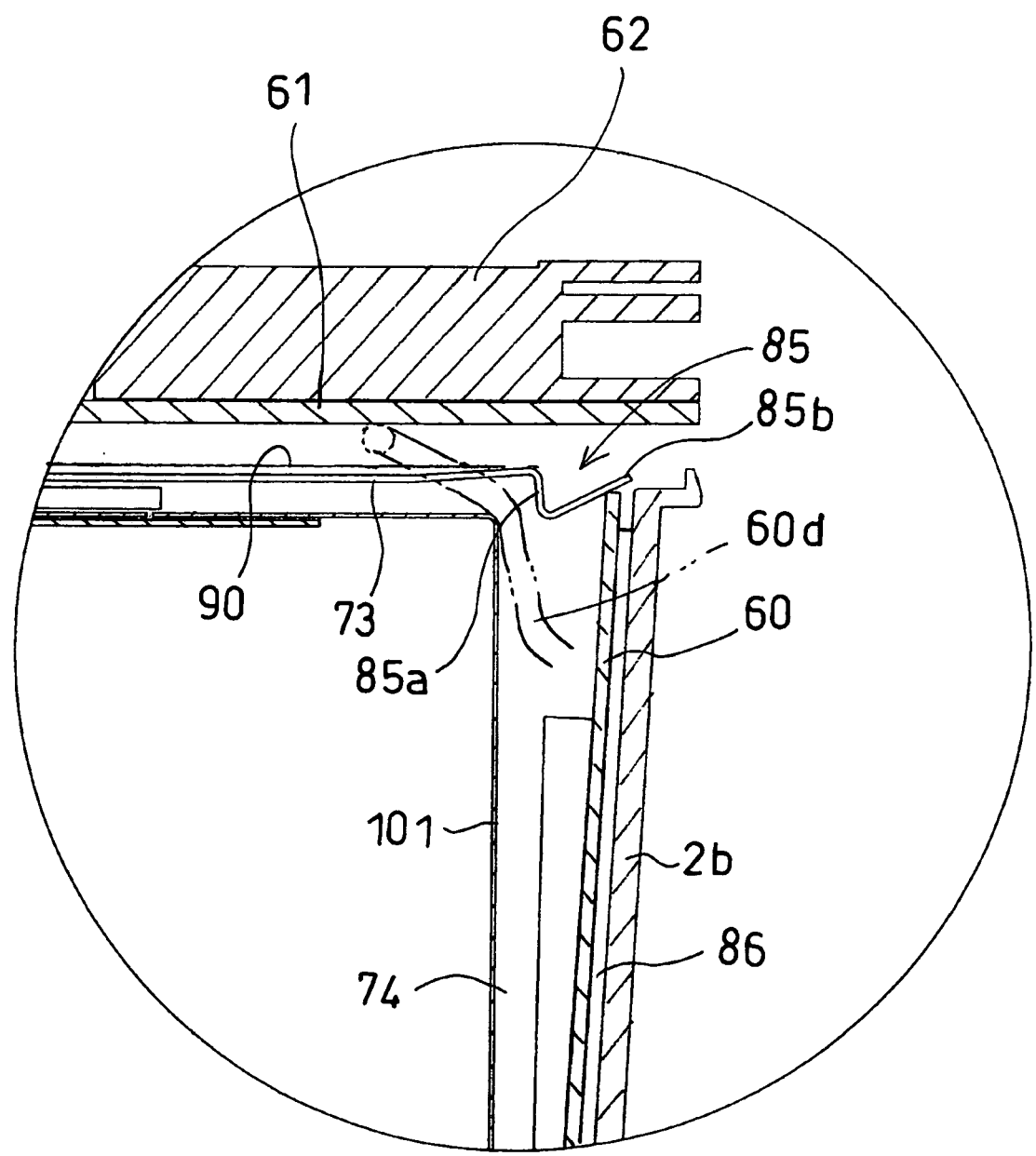
FIG. 10 is an enlarged side sectional view of a main portion showing a construction for holding an upper part of a wireless unit board.

As shown in FIG. 6, the shield case 70 includes a shield plate member 71 that extends over the main control board 61 while providing an appropriate gap therebetween and a shield plate member 73 that extends below the main control board 61 while providing an appropriate gap therebetween. The lower shield plate member 73 has a rectangular shape substantially conforming to the shape of the main control board 61 while the upper shield plate member 71 has a shape where the rear and right sides of the circumference are notched inwardly. These notched parts allow the connectors to be exposed for cable insertion and removal when the shield case 70 is mounted on the main unit case 2. By stretching and pasting an electrically insulating film 90 (FIG. 10 shows only the electrically insulating film 90 for the lower shield plate member 73) made of synthetic resin on the undersurface of the major surface of the upper shield plate member 71 and the top surface of the major surface of the lower shield plate member 73, electric short circuits between the upper or lower shield plate member 71, 73 and electronic components of the main control board 61 will be prevented even if either major surface of the shield plate members 71 and 73 should be deflected or deformed.

From what has been described up to now, it is clear that almost all parts of the main control board 61 excluding part of connectors are covered by both the shield plate members 71 and 73. A plurality of flanges 71a and 73a projecting sideways are formed in the outer edges of both the shield plate members 71 and 73 and are used for fastening both the shield plate members 71 and 73 to the main control board 61 by screws.

Then, as shown in FIGS. 6, 9, 10, 16, and 17, an elastic retainer plate 85 projecting forward between both forward open notched grooves 84a and 84b is integrally formed on the front side of the lower shield plate member 73 of the shield case 70. The retainer plate 85 is used for maintaining a posture of the wireless unit board 60 standing inside the accommodation space 74 to prevent rattling. To enhance elasticity and strength of the retainer plate 85, after a proximal portion 85a of the retainer plate 85 is bent downward with respect to the major surface of the lower shield plate member 73, a free end 85b thereof extends slantingly upward (see FIGS. 10 and 16). The free end 85b is intended to increase pressing force applied to the top end of the wireless unit board 60 standing inside the accommodation space 74 downward and to the front plate 2b of the main unit case 2 inward.

Figure 13:
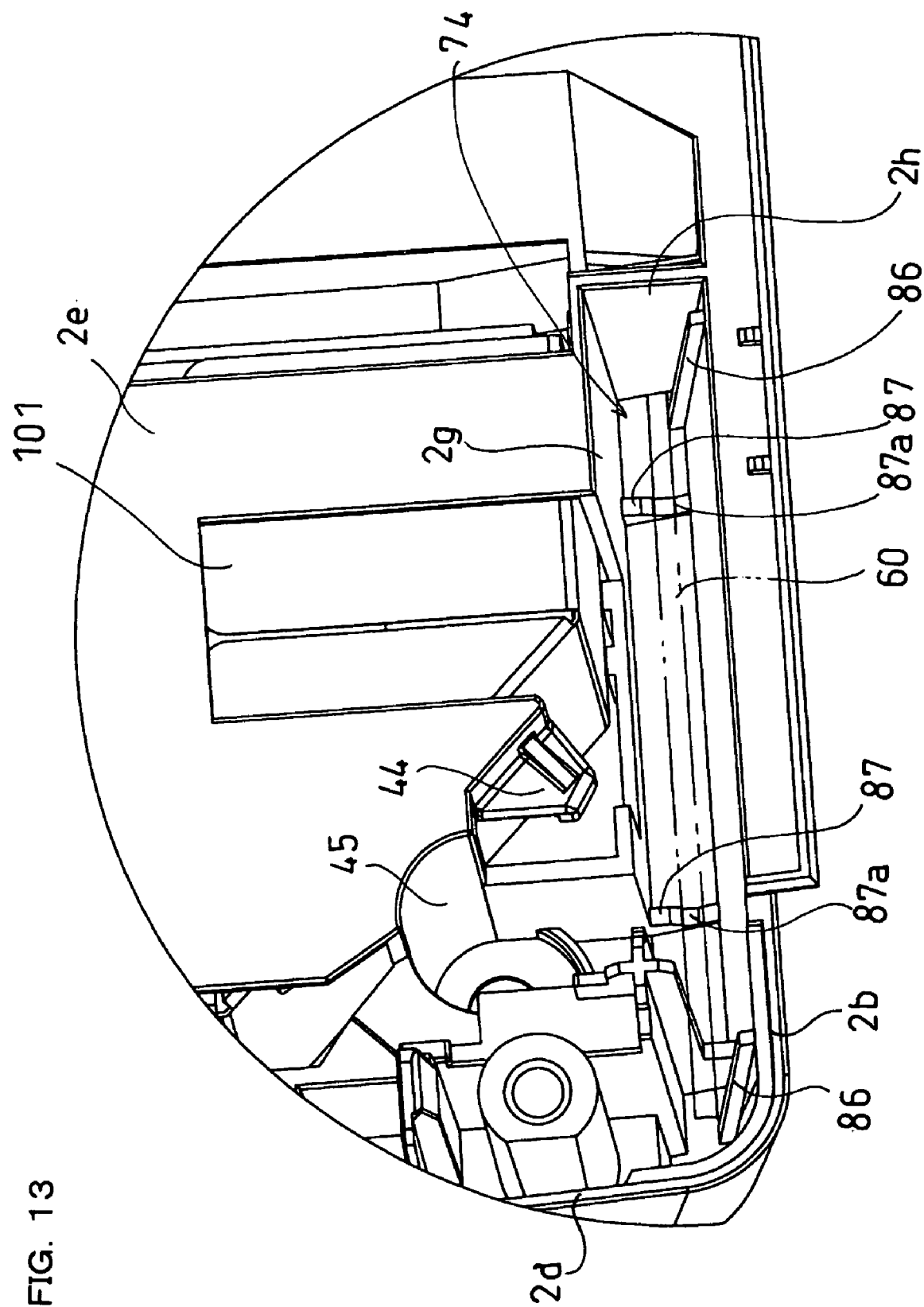
FIG. 13 is a perspective view seen from above showing a holder of the wireless LAN board.

On the other hand, as shown in FIG. 13, a pair of vertical posture maintaining ribs 86 is integrally projected from the inner surface of the front plate 2b in the accommodation space 74, and at the bottom of the accommodation space 74, a pair of receivers 87 each equipped with an upward open notched groove 87a to support the bottom end of the wireless unit board 60 for prevention of position shift are integrally provided to connect the front plate 2b and the rear partition plate 2g.

If, with the above construction, the wireless unit board 60 is vertically inserted into the accommodation space 74 with the surface on which the circuit module 60b thereof is mounted pointing toward the rear of the main unit case 2, the lower end of the wireless unit board 60 touches the notched grooves 87a in a pair of receivers 87 to support the wireless unit board 60. Then, when the shield case 70 is secured to the top surface plate 2e of the main unit case 2 by screws, the free end 85b of the retainer plate 85 hits the upper end surface of the wireless unit board 60. Then, the free end 85b presses elastically on the wireless unit board 60 such that the major back surface thereof is supported by a pair of vertical posture maintaining ribs 86 without rattling.

On the main control board 61, electronic components 66 such as a communication module and various kinds of connectors 62, 63, 64, and 65 are mounted. More concretely, two connectors provided on the forward side in FIG. 6 are connectors 62 and 63 for connecting various media cards. These connectors 62 and 63 are attached such that media slots 62a and 63a into which various media cards are inserted are arranged horizontally at the front of the main control board 61. Examples of external storage media capable of storing data such as images include smart media (registered trademark), compact flash (registered trademark), and memory stick (registered trademark), as well as SD cards and XD cards.

Figure 3:
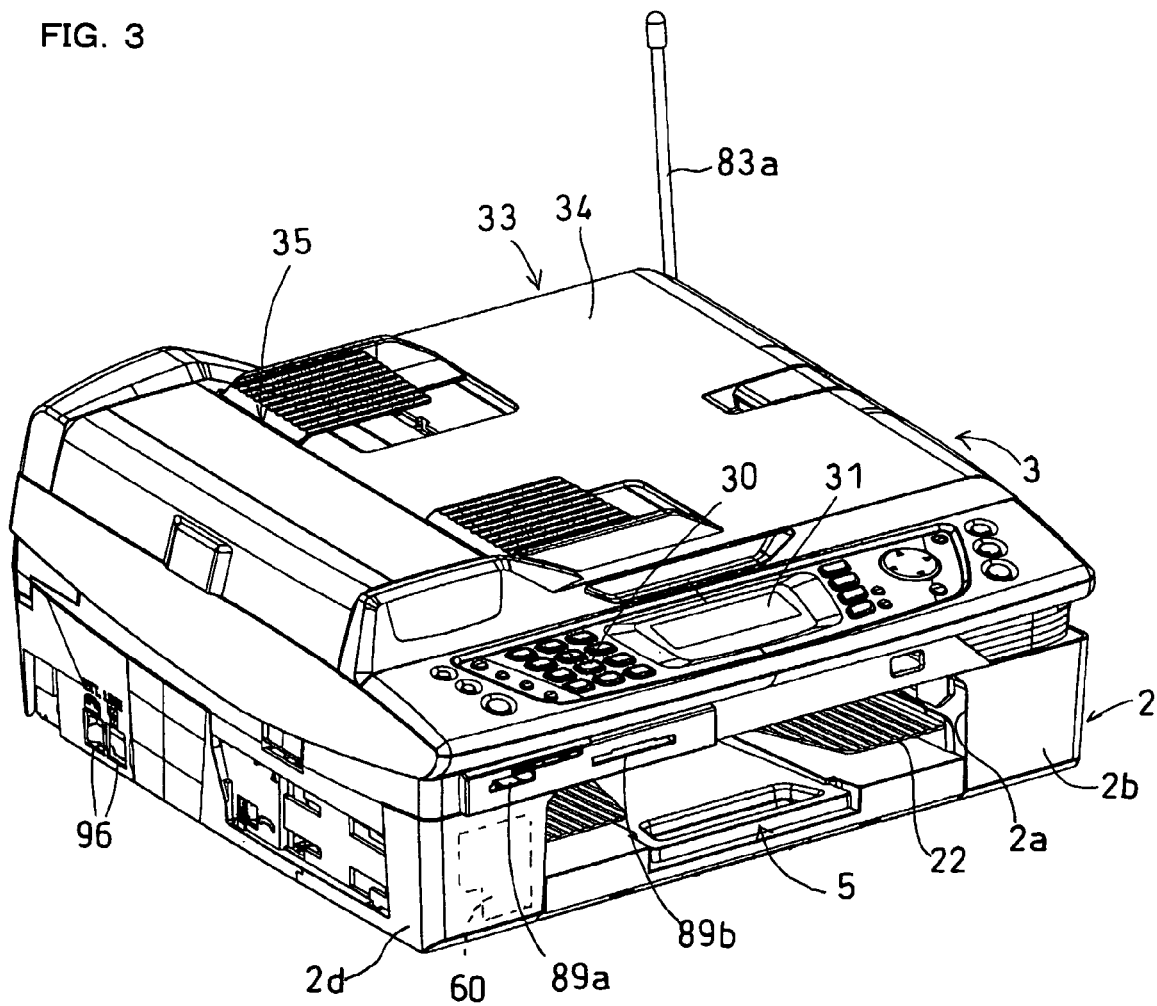
FIG. 3 is a overall perspective view seen from left front of the image-forming device.

Above the front of the main unit case 2, as shown in FIGS. 1, 3, and 6, a front cover 2f is mounted. The front cover 2f has sockets 89a and 89b linked to the media slots 62a and 63a of the connectors 62 and 63. If a media card (not shown) is inserted through the socket 89a or 89b, the media card is fitted into the connector 62 or 63 to electrically connect to the main control board 61.

Because the connectors 62 and 63 are directly connected to the main control board 61 as described above, no harness is needed. Thus, cost reduction, improvement of assembling properties, and quality stability can be achieved. Because the front cover 2f has the sockets 89a and 89b on the front side, insertion and removal of media cards can also be easily performed.

By covering the main control board 61 with the shield case 70, as described above, countermeasures against noise resulting from electromagnetic waves such as radio waves are taken. The power board 91 and the communication board 83 are among sources of noise disturbances. The communication board 83 is equipped with the antenna 83a and the antenna could be a strong noise source because it transmits and receives strong radio waves. Thus, if both boards 61 and 83 are positioned in the vicinity, the main control board 61 may be affected by noise, leading to a malfunction. In this embodiment, however, the main control board 61 is positioned in the left corner 2A on the front side of the main unit case 2, while the communication board 83 is positioned diagonally to the main control board 61, that is, in the right corner 2B on the rear side of the main unit case 2. Consequently, the main control board 61 is positioned wide apart from the communication board 83 and thus is less susceptible to effects from the communication board 83. This is an effective countermeasure against noise to achieve the normal functionality of communication.

Moreover, the wireless unit board (wireless LAN board) 60 and the wireless communication unit 81 are also positioned almost diagonally on a plane of the main unit case 2 so that the wireless unit board 60 for exchanging data via radio waves is as far away from the communication board 83 as possible (see FIG. 11A).

Figure 14:
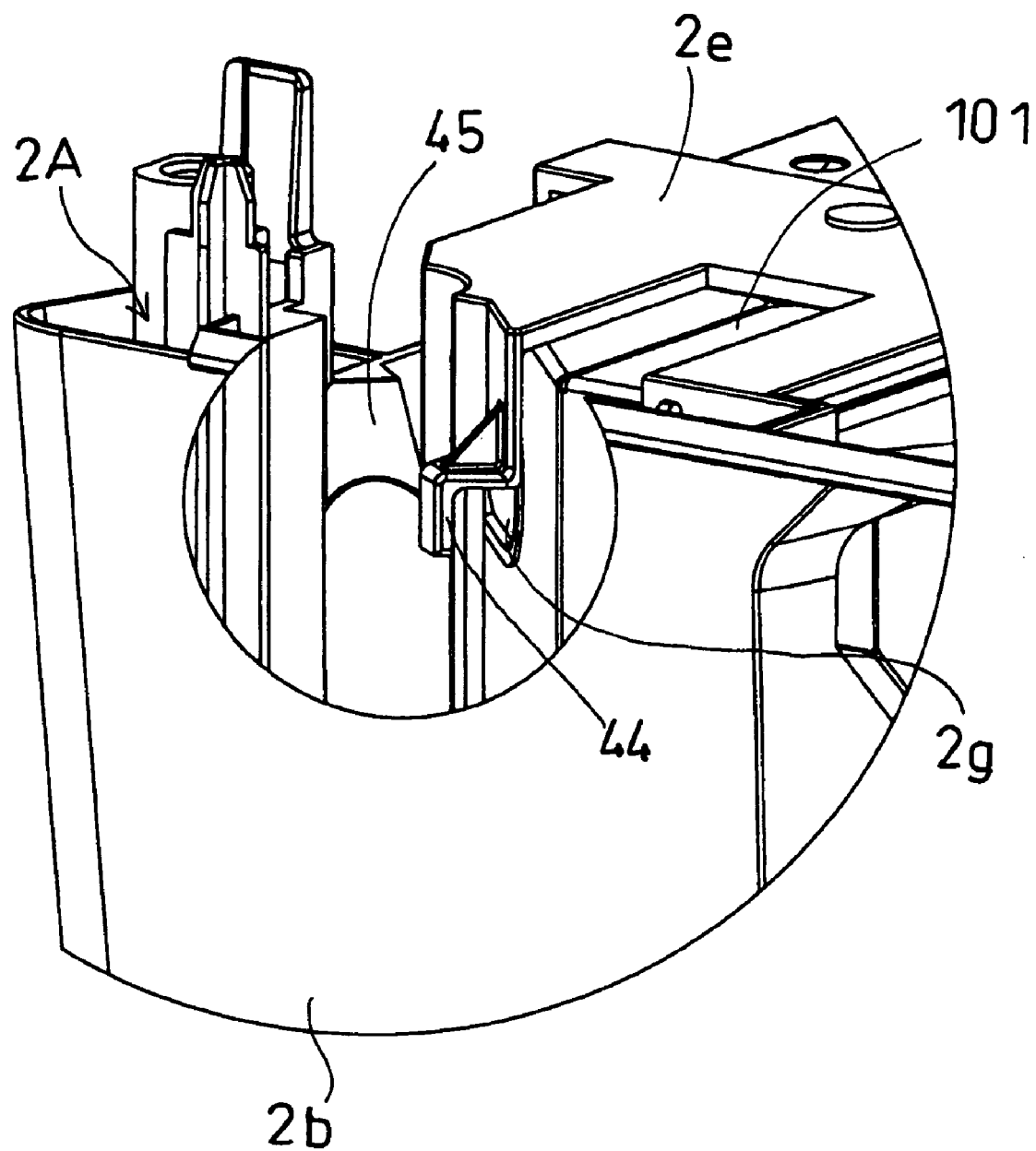
FIG. 14 is a perspective view showing a first embodiment of a harness running section.
Figure 15:
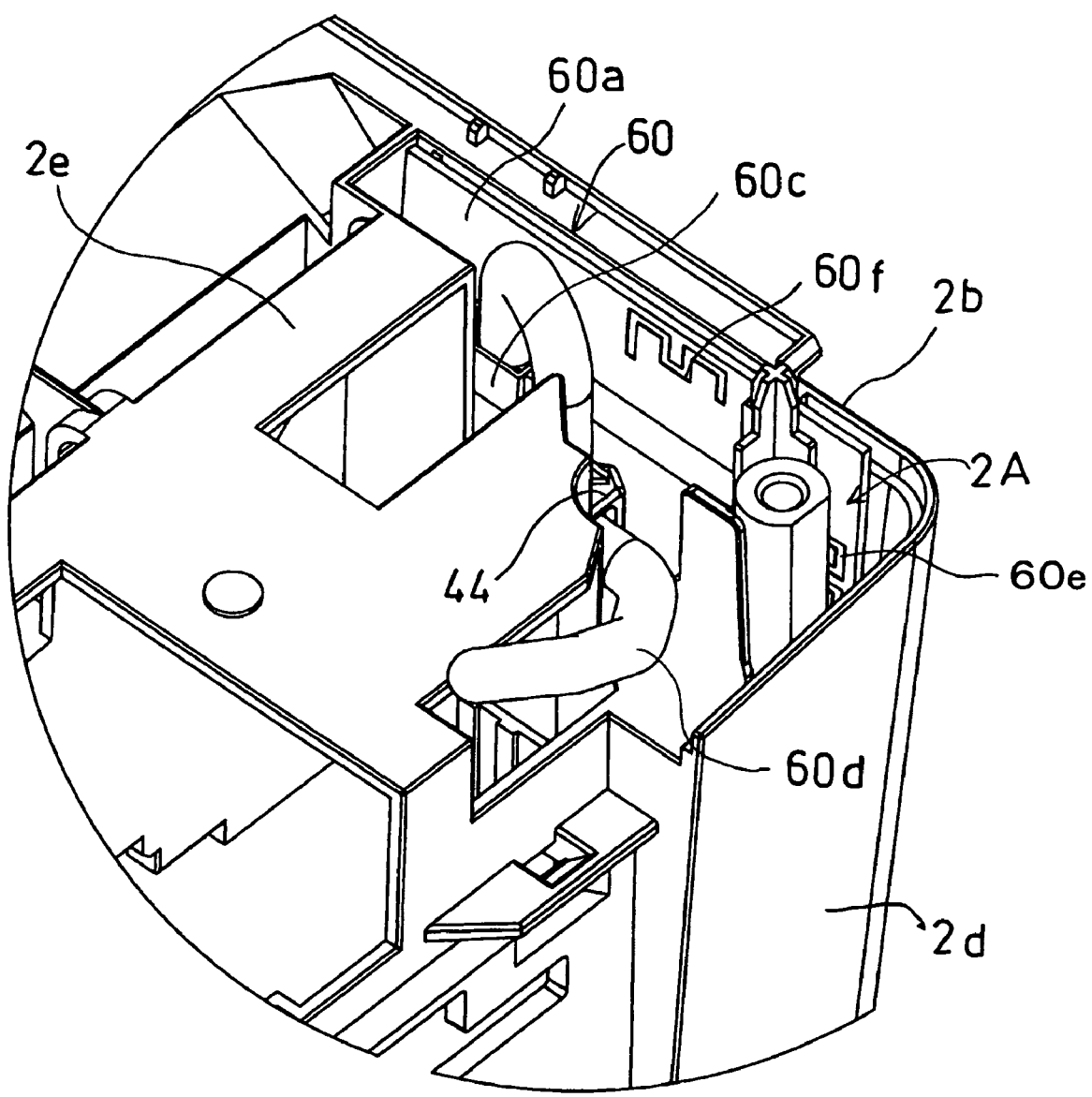
FIG. 15 is a perspective view showing a harness running state of the first embodiment.
Figure 16A:
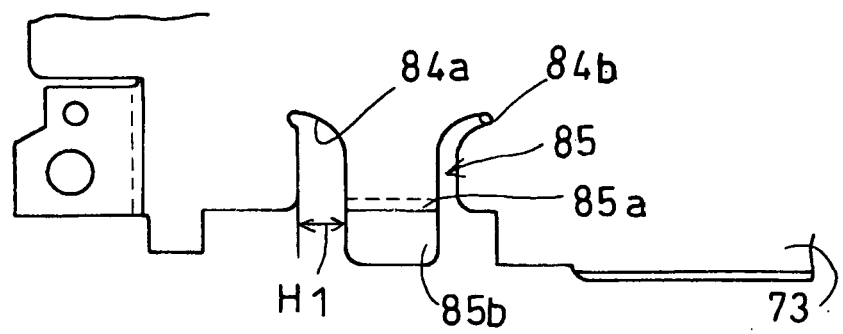
FIGS. 16A and 16B are plan views showing a second embodiment of a harness running section.
Figure 16B:
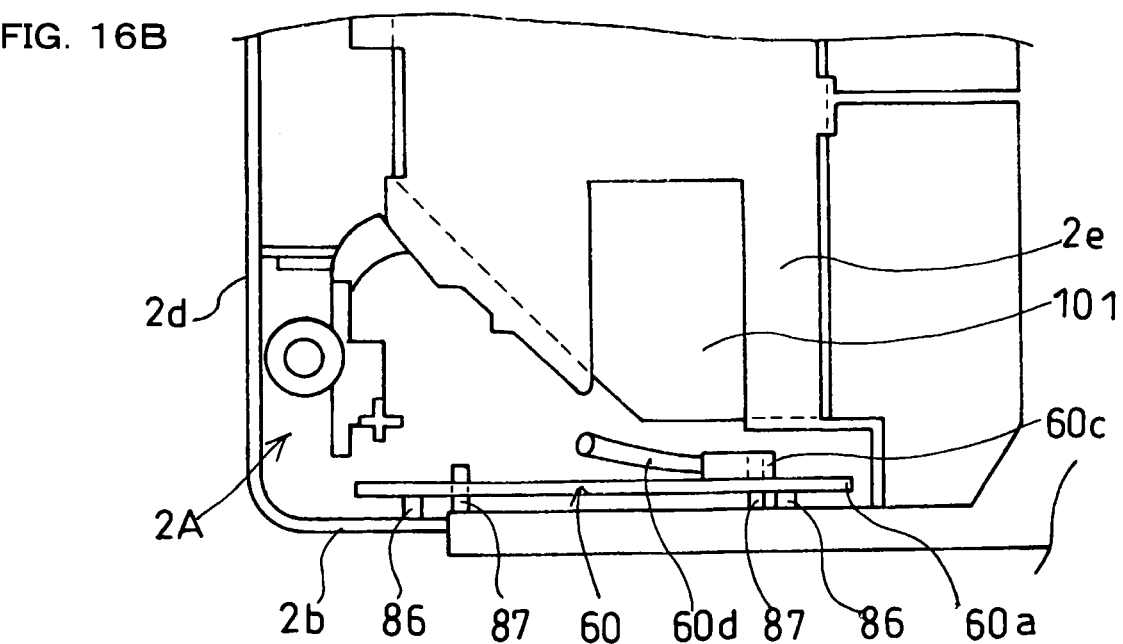
Figure 17:
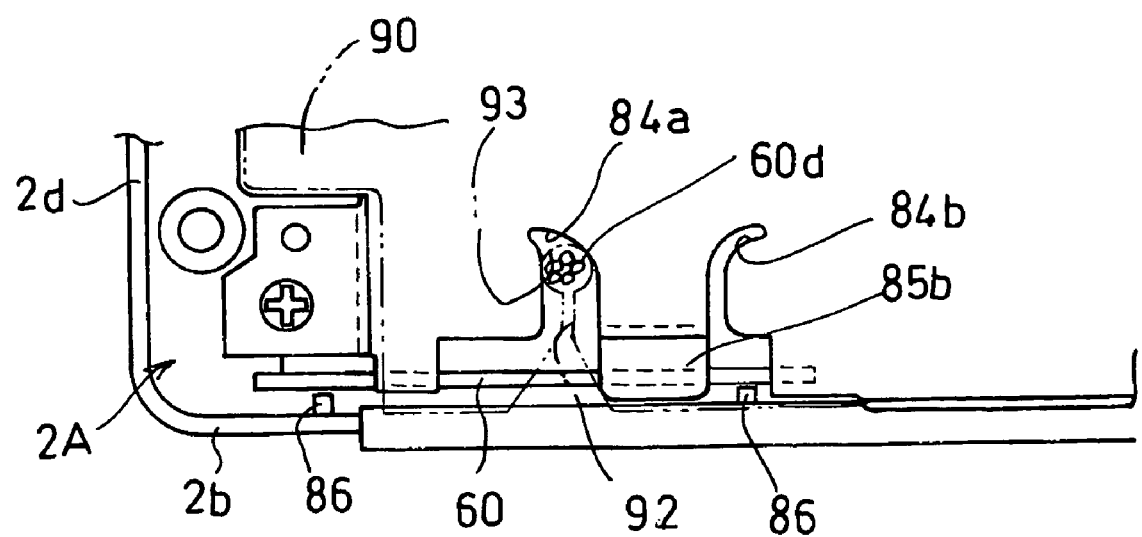
FIG. 17 is a plan view showing a harness running state of the second embodiment.
Figure 18:
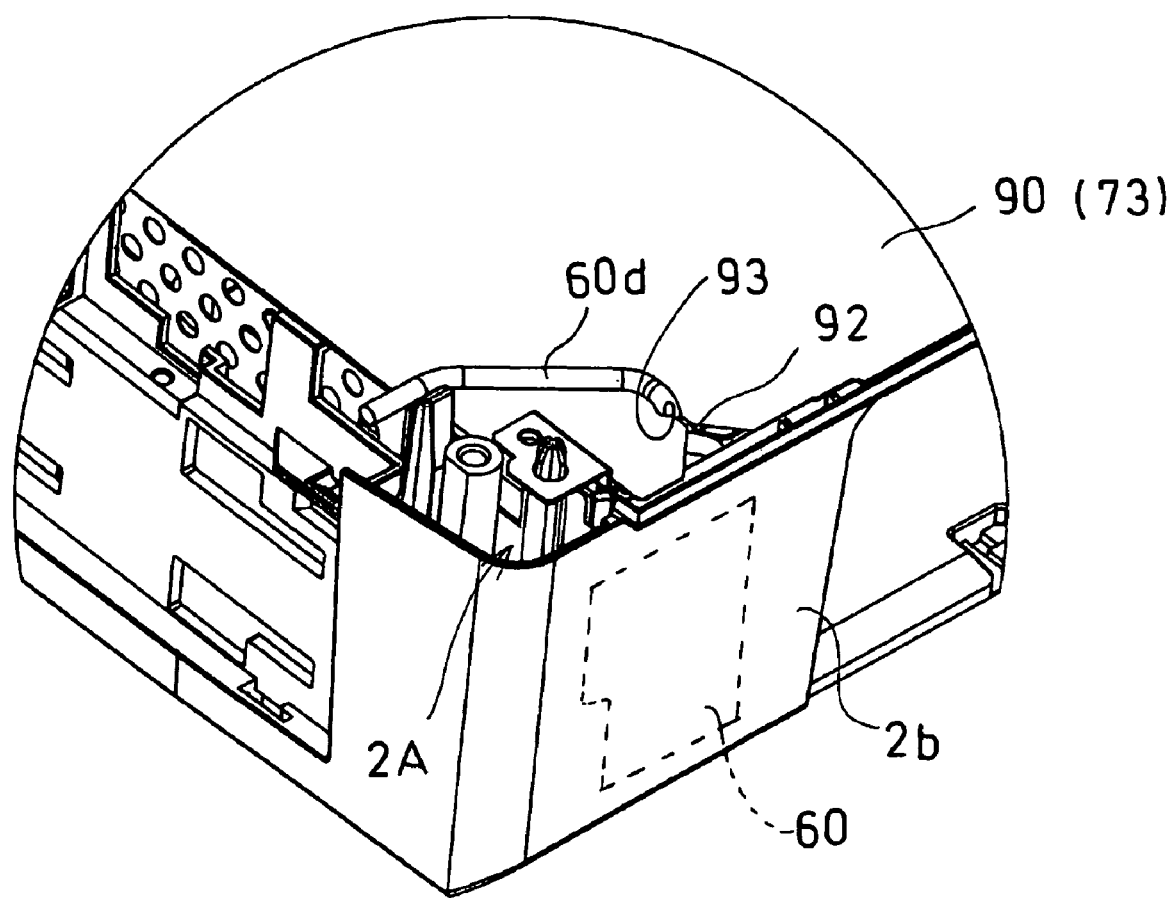
FIG. 18 is a perspective view showing the harness running state of the second embodiment.

Next, the construction to run (wire) the harness 60d from the wireless unit board 60 to the main control board 61 will be explained. A first embodiment thereof is shown in FIGS. 13-15. A downward open hook 44 is integrally formed with the rear partition plate 2g in the accommodation space 74, at a position near the side plate 2d. In the vicinity of an inner corner (corner 2A) at the confluence of the front plate 2b of the main unit case 2 and the left side plate 2d, an upward slanting and upward open groove guide 45 is integrally formed. FIG. 15 does not show the plate box 101 below the top surface plate 2e of the main unit case 2.

Figure 8:
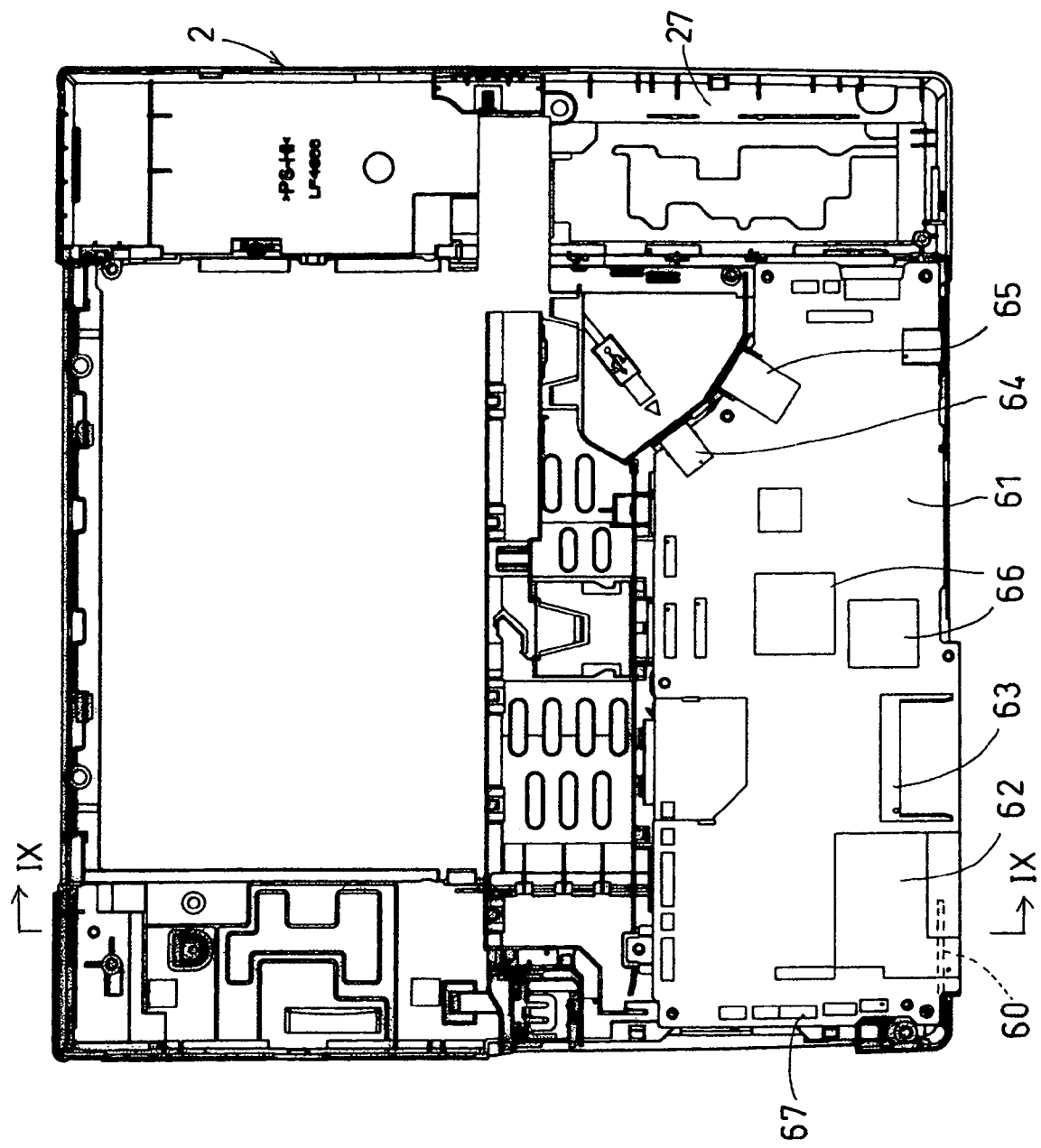
FIG. 8 is a plan view of the main unit case after removing the recorder unit and an ink cartridge holding space.

By adopting the above construction, an intermediate part of a harness 60d extending upward from the connector 60c of the wireless unit board 60 vertically disposed in the accommodation space 74 is locked to the hook 44 and then the harness 60b is led slantingly upward along the guide 45. Finally, an end connector (not shown) of the harness 60d led upward from the outside of the left edge of the main control board 61 is connected to a connector 67 (see FIGS. 5, 6, and 8) at the left edge of the top surface of the main control board 61.

The harness 60*d* is routed away from the main antenna 60*e* and the sub antenna 60*f* of the wireless unit board 60 so as not to oppose these antenna 60*e*, 60*f*. Accordingly, the harness 60*d*, i.e., a bundle of metallic wires is unlikely to block the radio waves transmitted between the wireless unit board 60 and external equipment, and a relatively wider radio wave passing area is ensured therebetween. Further, because the harness 60*d* is run through the hook 44 and along the guide 45, as has been described, the arrangement position of an intermediate part of the harness 60*d* will be stabilized and no shift thereof will occur. Thus, any failure of disconnection caused by a movable intermediate part of the harness 60*d* scraping against other members can reliably be prevented. It becomes also possible to connect the harness 60*d* to the connector 67 of the main control board 61 over a short distance.

With a wiring construction according to a second embodiment shown in FIGS. 16A-18, a width dimension H1 of one notched groove 84*a* for forming the retainer plate 85 in the lower shield plate member 73 described above is made so large as to enable the harness 60*d* to pass without contact. Then, as retaining means of the harness 60*d*, a cut line 92 open toward the front edge and a circular wiring passing hole 93 connected to the cut line 92 are formed on the insulating film 90 disposed on the top surface of the lower shield plate member 73. Finally, the film 90 is disposed on the top surface of the lower shield plate member 73 so that the cut line 92 and wiring passing hole 93 match the width of the notched groove 84*a* (see the chain double-dashed lines in FIG. 17 and FIG. 18).

With the above construction, an intermediate part of the harness 60*d* extending upward from the connector 60*c* of the wireless unit board 60 vertically disposed in the accommodation space 74 is inserted into the wiring passing hole 93 via cut line 92. Then, the cut line 92 part is closed by the restoring force of the film 90 itself and the intermediate part of the harness 60*d* is trapped in the wiring passing hole 93 and held. Next, an intermediate part of the harness 60*b* is passed through a gap between the top surface of the lower shield plate member 73 in the shield case 70 and the undersurface of the main control board 61 (see FIG. 10), and finally an end connector (not shown) of the harness 60*d* led upward and outward from the left edge of the main control board 61 is connected to the connector 67 (see FIGS. 5, 6, and 8) at the left edge of the top surface of the main control board 61.

According to the wiring construction in the second embodiment, the harness 60*d* is routed away from the main antenna 60*e* and the sub antenna 60*f* of the wireless unit board 60 so as not to oppose these antenna 60*e*, 60*f*. Accordingly, the harness 60*d*, i.e., a bundle of metallic wires is unlikely to block the radio waves transmitted between the wireless unit board 60 and external equipment, and a relatively wider radio wave passing area is ensured therebetween. Further, one notched groove 84*a* required for forming the retainer plate 85 having elasticity for maintaining a posture of the wireless unit board 60 can be utilized and the cut line 92 and wiring passing hole 93 are formed by using the insulating film 90 disposed on the top surface of the lower shield plate member 73. Therefore, the harness 60*d* can be wired readily with less cost, in a simple construction.

Figure 5:
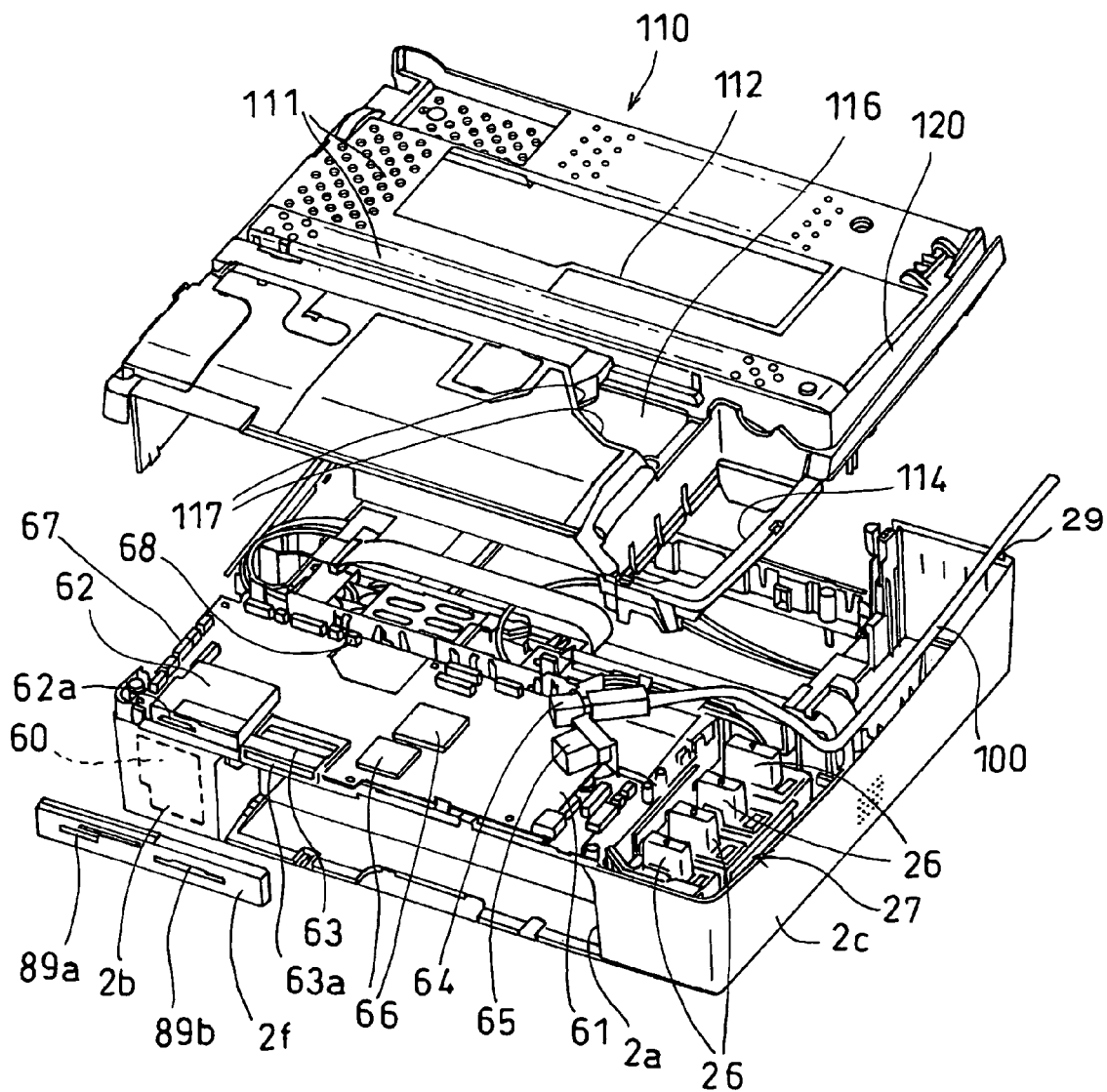
FIG. 5 is a perspective view after separating a main unit cover and the main unit case.

A USB connector 66 for connecting an external device such as a PC and a LAN connector 65 for connecting a LAN are mounted together on the rear right side of the main control board 61, and a connector 68 for connecting a network board is mounted on the rear somewhat left side of the board (see FIGS. 5 and 6). Although detailed explanations will be left out, in addition to these connectors, more connectors are mounted on the board 61 along the outer edges.

The power supply has a vertical block shape and contains the power board 91 on which a power circuit is mounted so that DC 5V used as power for CPU and memory and DC 30V for activating actuators such as motors are generated from a commercial AC power supply. The power board 91 and the main control board 61, and the power board 91 and motors are connected by electric wires (not shown) respectively, and a voltage generated by the power board 91 is applied to the main control board 61 and motors respectively.

The network board 95 is, on the other hand, a board for wire communication via telephone lines and is equipped, in this embodiment, with two modular connectors 96, that is, one modular connector for telephone line connection and the other for an external phone (see FIG. 3). This enables data communication with another facsimile device and a telephone call using the external phone.

A main unit cover 110 shown in FIG. 5 is made of synthetic resin and is formed large enough to enclose an opening at the top of the main unit case 2. The main unit cover 110 has a plurality of breathers 111 on the rear side of the top surface thereof and an opening 112 in the width direction of the cover 110. The top end of the carriage 12*a* is exposed through the opening 112. The main unit cover 110 also has a cartridge opening 114, through which four cartridges 26 are inserted altogether, on the front right side thereof and at a position facing the holding space 27 of the ink cartridges 26.

On the lateral side (upper side in FIG. 5) of the cartridge opening 114, a bearing surface 116 for cabling is provided. The bearing surface 116 is stepped down from other surfaces of the main unit cover 110. Portions of the step facing the connectors 64 and 65 of the main control board 61 are opened to be used as connector sockets 117.

A cabling groove 120 is formed from the rear side of the bearing surface 116 along the right wall of the main unit cover 110. The cabling groove 120 has a gutter-like structure and reaches the rear end of the main unit cover 110. When the main unit cover 110 is mounted on the main unit case 2, the connector sockets 117 of the bearing surface 116 are linked to the connectors 64 and 65 of the main control board 61, and the rear end of the cabling groove 120 is aligned with a cable exit 29 provided on the rear wall of the main unit case 2.

Therefore, as shown FIG. 11, it becomes possible to wire a cable 100 for LAN or USB while the main unit cover 110 is mounted on the main unit case 2. Since the cable 100 is accommodated in the cabling groove 120, the cable 100 is prevented from being damaged by being caught between the main unit case 2 and scanner 33 when the scanner 33 is opened/closed. Since the ink cartridges 26 are exposed through the cartridge opening 114, the ink cartridges 26 can be replaced while the main unit cover 110 is mounted on the main unit case 2.

According to the above-described embodiment, the main control board 61 is positioned wide apart from the wireless communication unit 81 on the rear side of the main unit case 2 in a plan view of the image-forming device 1, and the main control board 61 is covered with the shield case 70. Therefore, the main control board 61 is less susceptible to noise caused by radio waves. The wireless unit board 60 is positioned in the front left corner of the main unit case 2, while the communication board 83 of the wireless communication unit 80 is positioned diagonally to the wireless unit board 60, that is, in the rear right corner of the main unit case 2. Thus, both boards 60 and 83 are positioned most widely apart, which is effective as a countermeasure against noise.

According to the embodiment, the wireless unit board 60 is positioned in the accommodation space 74 defined by the corner formed by the front plate 26 of the main unit case 2 and one of side plates 2d. Therefore, it becomes possible to utilize the front plate 2b and side plate 2d of the main unit case 2 to form the accommodation space 74, enabling a simple construction and cost reduction.

According to the embodiment, the wireless unit board 60 vertically disposed in the accommodation space 74 is positioned and held to be away from the plate box 101 by the retainer plate 85 that presses on the upper end surface of the wireless unit board 60. The retainer plate 85 is formed in the shield plate member 73 disposed above the wireless unit board 60. Therefore, compared with a case where retaining means is provided separately for maintaining the posture of the wireless unit board 60, it becomes possible to make smaller the accommodation space in which the wireless unit board 60 is disposed and to reduce man-hours for mounting the board 60, as well as to enable simple construction and reduce manufacturing cost, resulting in a compact image-forming electronic device.

According to the embodiment, the retainer plate 85 is integrally formed at the front end of the shield plate member 73 to have elasticity itself and is constructed to elastically press on the upper end surface of the wireless unit board 60 when the shield plate member is secured to the main unit case 2. Therefore, the posture of the wireless unit board 60 can be maintained without applying excessive force to the wireless unit board 60.

According to the embodiment, the posture maintaining rib 86 supporting part of one of major surfaces of the wireless unit board 60 is projected from the inner surface of the front plate 2b of the main unit case 2 toward the accommodation space 74. Therefore, it becomes possible to support the wireless unit board 60 in the accommodation space 74 with the gap with most of the major surface of the wireless unit board and improve the cooling effect of the major surface of the wireless unit board 60, resulting in a very simple construction.

According to the embodiment, retaining means 92, 93 is provided at least at the front end of the shield plate member 73 so that the intermediate part of the harness 60d connecting the wireless unit board 60 and the main control board 61 is held to the notched groove 84a formed at the front end of the shield plate member 73. Therefore, time for wiring the harness can be reduced. If, in that case, the construction in which the cut line 92 and the wiring passing hole 93 are formed using the insulating film 90 to be pasted on the top surface of the shield plate member 73 is adopted as the retaining means, the construction for wiring the harness 60d can be made simple without increasing material cost.

According to embodiment, one of notched grooves 84a, 84b required for forming the retainer plate having elasticity for maintaining the posture of the wireless unit board 60 can be used for wiring the harness 60a. Therefore, the construction can be made still simpler.

According to the embodiment, the downward open hook 44 and the upward slanting and upward open groove guide 45 are provided at the position inside the main unit case 2 opposed to the other of major surfaces of the wireless unit board 60, the intermediate part of the harness 60d connecting the wireless unit board 60 and the main control board 61 is locked to the hook 44, and the intermediate part of the harness 60d extending from the lock 44 is run along the guide 45. Therefore, a stable wiring construction in which no intermediate part of the harness shifts can be established. Then, if the hook 44 and guide 45 are integrally formed with the main unit case 2, manufacturing costs can be reduced further.

According to the embodiment, noise caused by the power board 91 can be cut off using the plate box 101, making the wireless unit board 60 less susceptible to noise.

As this invention may be embodied in several forms without departing from the spirit of essential characteristics thereof, the present embodiments are therefore illustrative and not restrictive, since the scope of the invention is defined by the appended claims rather than by description preceding them, and all changes that fall within metes and bounds of the claims, or equivalence of such metes and bounds thereof are therefore intended to be embraced by the claims.

What is claimed is:

1. An electronic device comprising:
a wireless unit board for transmitting and receiving a radio signal to and from external equipment;
a casing having a side plate;
a circuit board;
a main control board for controlling the electronic device;
a first shield plate covering the circuit board; and
a second shield plate holding the main control board thereon and disposed substantially horizontally above the first shield plate,
wherein the wireless unit board is disposed in an accommodation space that is enclosed by the side plate of the casing, the first shield plate, and the second shield plate, while one of opposed major surfaces of the wireless unit board is facing the side plate of the casing, and
wherein the accommodation space is defined in a corner formed by the side plate and another side plate of the casing, the side plate and the another side plate being adjacent to each other.

2. An electronic device comprising:
a wireless unit board for transmitting and receiving a radio signal to and from external equipment;
a casing having a side plate;
a circuit board;
a main control board for controlling the electronic device;
a first shield plate covering the circuit board; and
a second shield plate holding the main control board thereon and disposed substantially horizontally above the first shield plate,
wherein the wireless unit board is disposed in an accommodation space that is enclosed by the side plate of the casing, the first shield plate, and the second shield plate, while one of opposed major surfaces of the wireless unit board is facing the side plate of the casing, and
wherein the wireless unit board is disposed vertically in the accommodation space with the one of opposed major surfaces thereof in parallel with the side plate of the casing.

3. The electronic device according to claim 1, wherein the casing is made of synthetic resin, and the first shield plate and the second shield plate are made of metal.

4. The electronic device according to claim 1, further comprising:
a wireless communication unit on which a wireless antenna and electronic components are mounted,
wherein the wireless communication unit and the accommodation space for the wireless unit board are located in substantially opposite corners diagonally to each other in plane view of the electronic device.

5. The electronic device according to claim 4, wherein the wireless unit board is disposed in one of the opposite corners at a front of the casing while the wireless communication unit is disposed in the other of the opposing corners at a rear of the casing.

6. An electronic device comprising:
a wireless unit board for transmitting and receiving a radio signal to and from external equipment;
a casing having a side plate;
a circuit board;
a main control board for controlling the electronic device;
a first shield plate covering the circuit board; and
a second shield plate holding the main control board thereon and disposed substantially horizontally above the first shield plate,
wherein the wireless unit board is disposed in an accommodation space that is enclosed by the side plate of the casing, the first shield plate, and the second shield plate, while one of opposed major surfaces of the wireless unit board is facing the side plate of the casing, and
wherein the accommodation space is further enclosed by a first partition plate facing the side plate and a second partition plate intersecting the first partition plate and the side plate, the first partition plate and the second partition plate being formed integrally with the casing.

7. The electronic device according to claim 1, wherein the accommodation space is further enclosed by a bottom plate integrally formed with the casing, the bottom plate being formed with a groove that receives an end of the wireless unit board therein.

8. The electronic device according to claim 1, wherein the circuit board is a power board for supplying power to the electronic device.

9. The electronic device according to claim 1, wherein a retainer plate formed on the second shield plate presses on an upper end of the wireless unit board such that the wireless unit board is away from the first shield plate.

10. The electronic device according to claim 9, wherein the retainer plate is formed to have elasticity integrally with the second shield plate at an edge thereof adjacent to the side plate of the casing, and elastically presses on the upper end of the wireless unit board when the second shield plate is secured to the casing.

11. The electronic device according to claim 9, wherein a rib is projected from an inner surface of the side plate toward the wireless unit board, and supports the one of opposed major surfaces of the wireless unit board.

12. The electronic device according to claim 1, further comprising:
a notch formed in the second shield plate at an edge thereof adjacent to the side plate of the casing; and
a retaining member formed by an electrical insulating member provided on the second shield plate,
wherein an intermediate part of a harness connecting between the wireless unit board and the main control board is retained at the notch by the retaining member.

13. The electronic device according to claim 12, wherein the electrical insulating member is formed with a cut line through which the harness is inserted and a hole into which the harness is fitted.

14. The electronic device according to claim 12, wherein a retainer plate formed on the second shield plate presses on an upper end of the wireless unit board such that the wireless unit board is away from the first shield plate, and the notch is formed adjacent to a proximal portion of the retainer plate.

15. The electronic device according to claim 1, further comprising:
a hook which is open downward and disposed inside the casing to face the other of opposed major surfaces of the wireless unit board; and
a groove guide which is open upward and disposed inside the casing to face the other of opposed major surfaces of the wireless unit board,
wherein a first intermediate part of a harness connecting between the wireless unit board and the main control board is engaged to the hook and a second intermediate part of the harness extending from the hook is guided along the groove guide.

16. The electronic device according to claim 1, wherein the electronic device is an image-forming device which, in the casing, includes:
a transfer unit for supplying and ejecting recording media; and
a recorder for forming images on the recording media transferred by the transfer unit.

17. The electronic device according to claim 16, wherein the image-forming device further includes:
an upper casing configured to be opened and closed pivotally with respect to the casing, and
a reading mechanism disposed inside the upper casing and configured to reciprocate to read a document.

* * * * *